US009999016B2

United States Patent
Yi et al.

(10) Patent No.: US 9,999,016 B2
(45) Date of Patent: Jun. 12, 2018

(54) STATUS REPORT POLLING TO AVOID HFN DE-SYNCHRONIZATION

(71) Applicant: LG ELECTRONICS INC., Seoul (KR)

(72) Inventors: Seungjune Yi, Seoul (KR); Sunyoung Lee, Seoul (KR)

(73) Assignee: LG ELECTRONICS INC., Seoul (KR)

(*) Notice: Subject to any disclaimer, the term of this patent is extended or adjusted under 35 U.S.C. 154(b) by 0 days. days.

(21) Appl. No.: 15/688,714

(22) Filed: Aug. 28, 2017

(65) Prior Publication Data

US 2018/0070325 A1    Mar. 8, 2018

Related U.S. Application Data (60) Provisional application No. 62/383,485, filed on Sep. 4, 2016.

(51) Int. Cl.
| | | |
|---|---|---|
| *H04W 56/00* | (2009.01) | |
| *H04L 1/18* | (2006.01) | |
| *H04W 76/04* | (2009.01) | |
| *H04W 88/10* | (2009.01) | |
| *H04W 88/06* | (2009.01) | |
| *H04W 76/02* | (2009.01) | |

(52) U.S. Cl.
CPC ............. *H04W 56/003* (2013.01); *H04L 1/18* (2013.01); *H04W 76/046* (2013.01); *H04W 76/025* (2013.01); *H04W 88/06* (2013.01); *H04W 88/10* (2013.01)

(58) Field of Classification Search
CPC .................................................... H04W 80/02
USPC ........................................................ 370/329
See application file for complete search history.

(56) References Cited

U.S. PATENT DOCUMENTS

| | | | | |
|---|---|---|---|---|
| 7,911,969 B2* | 3/2011 | Fischer | ................. | H04L 1/0031 370/252 |
| 7,978,616 B2* | 7/2011 | Chun | ................... | H04W 28/06 370/242 |
| 8,335,189 B2* | 12/2012 | Wang | ................... | H04W 12/02 370/331 |
| 8,730,996 B2* | 5/2014 | Wang | ................... | H04L 1/1835 370/466 |
| 8,774,231 B2* | 7/2014 | Kitazoe | ................. | H04W 12/04 370/230 |
| 2008/0130580 A1* | 6/2008 | Chaponniere | ......... | H04W 36/02 370/331 |
| 2008/0167089 A1* | 7/2008 | Suzuki | .................. | H04L 1/1829 455/574 |
| 2009/0103478 A1* | 4/2009 | Sammour | ............. | H04L 1/1874 370/328 |
| 2009/0104890 A1* | 4/2009 | Wang | .................... | H04W 12/02 455/410 |

(Continued)

*Primary Examiner* — Edan Orgad
*Assistant Examiner* — Emmanuel K Maglo
(74) *Attorney, Agent, or Firm* — Lee Hong Degerman Kang Waimey (57) ABSTRACT

A method and apparatus for a user equipment (UE) to transmit data to a network is disclosed. The UE sets a poll bit in a PDCP (Packet Data Convergence Protocol) PDU (Protocol Data Unit) to a first value to request a status report including a second FMN (First Missing Number) from the network, if a predetermined number of PDCP SDUs (Service Data Units) are transmitted after a PDCP SDU corresponding to a first FMN.

10 Claims, 6 Drawing Sheets

(56) References Cited

U.S. PATENT DOCUMENTS

| | | | |
|---|---|---|---|
| 2009/0175163 A1* | 7/2009 | Sammour | H04L 1/1685 370/216 |
| 2009/0238098 A1* | 9/2009 | Cai | H04W 76/048 370/254 |
| 2010/0091709 A1* | 4/2010 | Yi | H04W 12/02 370/328 |
| 2010/0177733 A1* | 7/2010 | Yi | H04L 1/1614 370/331 |
| 2010/0322197 A1* | 12/2010 | Adjakple | H04B 7/155 370/332 |
| 2011/0228746 A1* | 9/2011 | Chun | H04W 28/06 370/331 |
| 2012/0224525 A1* | 9/2012 | Wang | H04W 80/02 370/315 |
| 2012/0230298 A1* | 9/2012 | Kitazoe | H04W 12/04 370/331 |
| 2014/0293897 A1* | 10/2014 | Kuo | H04W 24/02 370/329 |
| 2014/0293903 A1* | 10/2014 | Kuo | H04W 24/02 370/329 |
| 2015/0180706 A1* | 6/2015 | Uchino | H04L 41/0672 370/225 |
| 2015/0215987 A1* | 7/2015 | Kim | H04W 76/04 370/329 |
| 2016/0164793 A1* | 6/2016 | Basu Mallick | H04W 28/06 370/235 |
| 2016/0338074 A1* | 11/2016 | Chou | H04W 76/046 |
| 2017/0064768 A1* | 3/2017 | Lee | H04L 43/16 |
| 2017/0078914 A1* | 3/2017 | Fujishiro | H04W 28/04 |

\* cited by examiner

(a) Control-Plane Protocol Stack (b) User-Plane Protocol Stack

STATUS REPORT POLLING TO AVOID HFN DE-SYNCHRONIZATION

CROSS-REFERENCE TO RELATED APPLICATIONS

Pursuant to 35 U.S.C. § 119(e), this application claims the benefit of U.S. Provisional Patent Application No. 62/383,485, filed on Sep. 4, 2016, the contents of which are all hereby incorporated by reference herein in their entirety.

BACKGROUND OF THE INVENTION

Field of the Invention

The present invention relates to a method and apparatus for a user equipment (UE) polling status report to a network in order to avoid HFN De-Synchronization problem. The present invention is useful especially in a wireless communication system supporting LWA (LTE WLAN Aggregation) scheme, but it can be applied to other wireless communication system.

Discussion of the Related Art

Figure 1:
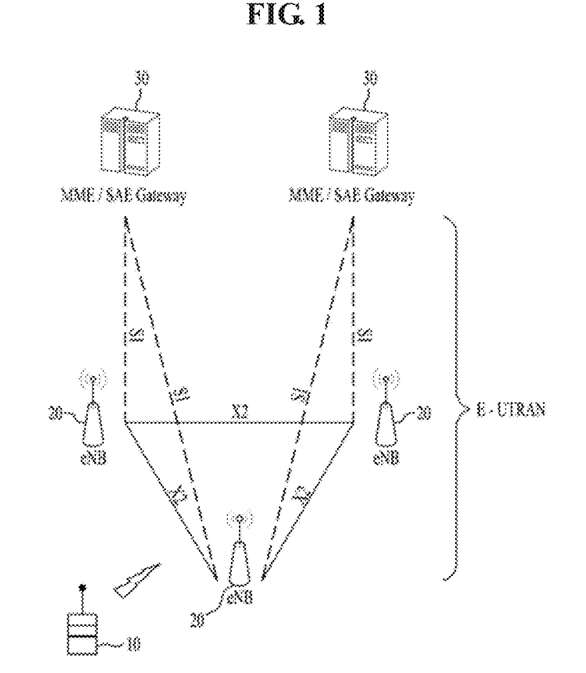
FIG. 1 is a block diagram illustrating network structure of an evolved universal mobile telecommunication system (E-UMTS)

As an example of a mobile communication system to which the present invention is applicable, a 3rd Generation Partnership Project Long Term Evolution (hereinafter, referred to as LTE) communication system is described in brief FIG. 1 is a block diagram illustrating network structure of an evolved universal mobile telecommunication system (E-UMTS). The E-UMTS may be also referred to as an LTE system. The communication network is widely deployed to provide a variety of communication services such as voice (VoIP) through IMS and packet data.

As illustrated in FIG. 1, the E-UMTS network includes an evolved UMTS terrestrial radio access network (E-UTRAN), an Evolved Packet Core (EPC) and one or more user equipment. The E-UTRAN may include one or more evolved NodeB (eNodeB) 20, and a plurality of user equipment (UE) 10 may be located in one cell. One or more E-UTRAN mobility management entity (MME)/system architecture evolution (SAE) gateways 30 may be positioned at the end of the network and connected to an external network.

As used herein, "downlink" refers to communication from eNodeB 20 to UE 10, and "uplink" refers to communication from the UE to an eNodeB. UE 10 refers to communication equipment carried by a user and may be also referred to as a mobile station (MS), a user terminal (UT), a subscriber station (SS) or a wireless device. eNode B 20 may be reffered to as eNB, gNB etc. However, in the following explanation, the term 'UE' and 'eNodeB' are used for convenience.

Figure 2:
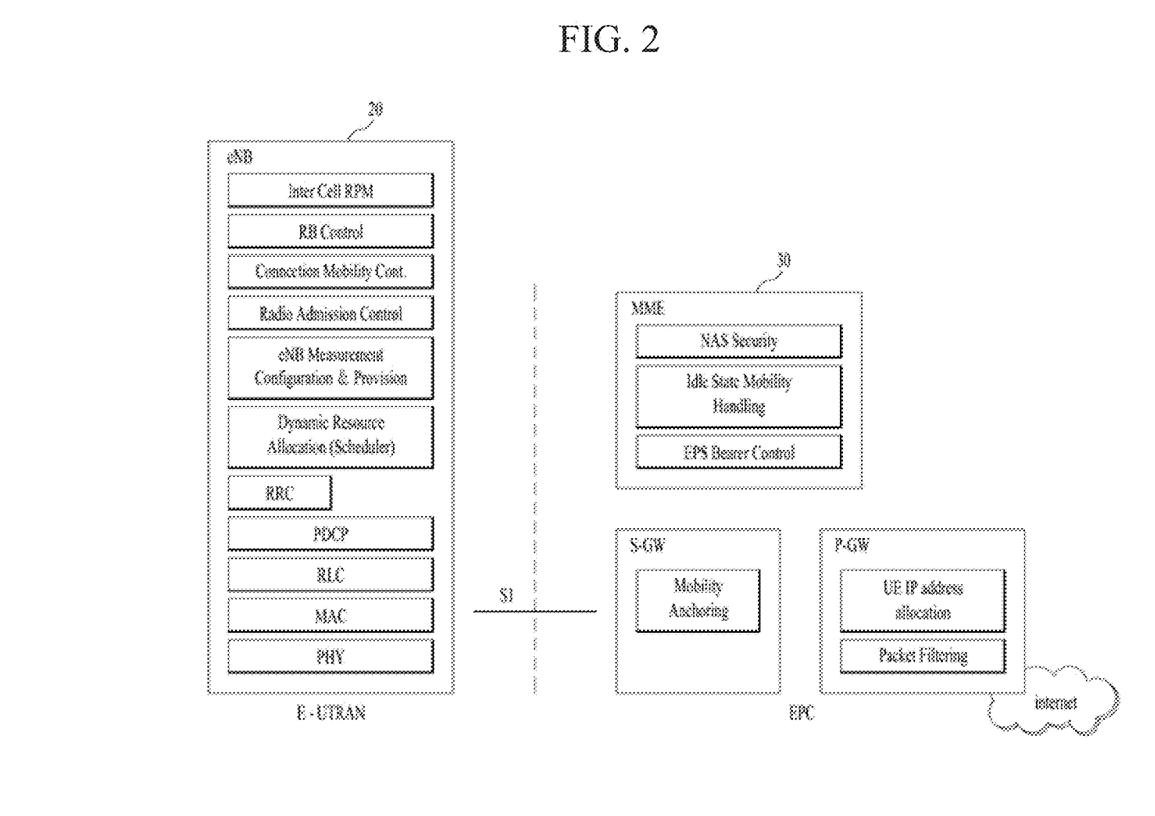
FIG. 2 is a block diagram depicting architecture of a typical E-UTRAN and a typical EPC.

FIG. 2 is a block diagram depicting architecture of a typical E-UTRAN and a typical EPC.

As illustrated in FIG. 2, an eNodeB 20 provides end points of a user plane and a control plane to the UE 10. MME/SAE gateway 30 provides an end point of a session and mobility management function for UE 10. The eNodeB and MME/SAE gateway may be connected via an S1 interface.

The eNodeB 20 is generally a fixed station that communicates with a UE 10, and may also be referred to as a base station (BS) or an access point. One eNodeB 20 may be deployed per cell. An interface for transmitting user traffic or control traffic may be used between eNodeBs 20.

The MME provides various functions including NAS signaling to eNodeBs 20, NAS signaling security, AS Security control, Inter CN node signaling for mobility between 3GPP access networks, Idle mode UE Reachability (including control and execution of paging retransmission), Tracking Area list management (for UE in idle and active mode), PDN GW and Serving GW selection, MME selection for handovers with MME change, SGSN selection for handovers to 2G or 3G 3GPP access networks, Roaming, Authentication, Bearer management functions including dedicated bearer establishment, Support for PWS (which includes ETWS and CMAS) message transmission. The SAE gateway host provides assorted functions including Per-user based packet filtering (by e.g. deep packet inspection), Lawful Interception, UE IP address allocation, Transport level packet marking in the downlink, UL and DL service level charging, gating and rate enforcement, DL rate enforcement based on APN-AMBR. For clarity MME/SAE gateway 30 will be referred to herein simply as a "gateway," but it is understood that this entity includes both an MME and an SAE gateway.

A plurality of nodes may be connected between eNodeB 20 and gateway 30 via the S1 interface. The eNodeBs 20 may be connected to each other via an X2 interface and neighboring eNodeBs may have a meshed network structure that has the X2 interface.

As illustrated in FIG. 2, eNodeB 20 may perform functions of selection for gateway 30, routing toward the gateway during a Radio Resource Control (RRC) activation, scheduling and transmitting of paging messages, scheduling and transmitting of Broadcast Channel (BCCH) information, dynamic allocation of resources to UEs 10 in both uplink and downlink, configuration and provisioning of eNodeB measurements, radio bearer control, radio admission control (RAC), and connection mobility control in LTE_ACTIVE state. In the EPC, and as noted above, gateway 30 may perform functions of paging origination, LTE-IDLE state management, ciphering of the user plane, System Architecture Evolution (SAE) bearer control, and ciphering and integrity protection of Non-Access Stratum (NAS) signaling.

The EPC includes a mobility management entity (MME), a serving-gateway (S-GW), and a packet data network-gateway (PDN-GW). The MME has information about connections and capabilities of UEs, mainly for use in managing the mobility of the UEs. The S-GW is a gateway having the E-UTRAN as an end point, and the PDN-GW is a gateway having a packet data network (PDN) as an end point.

Figure 3:
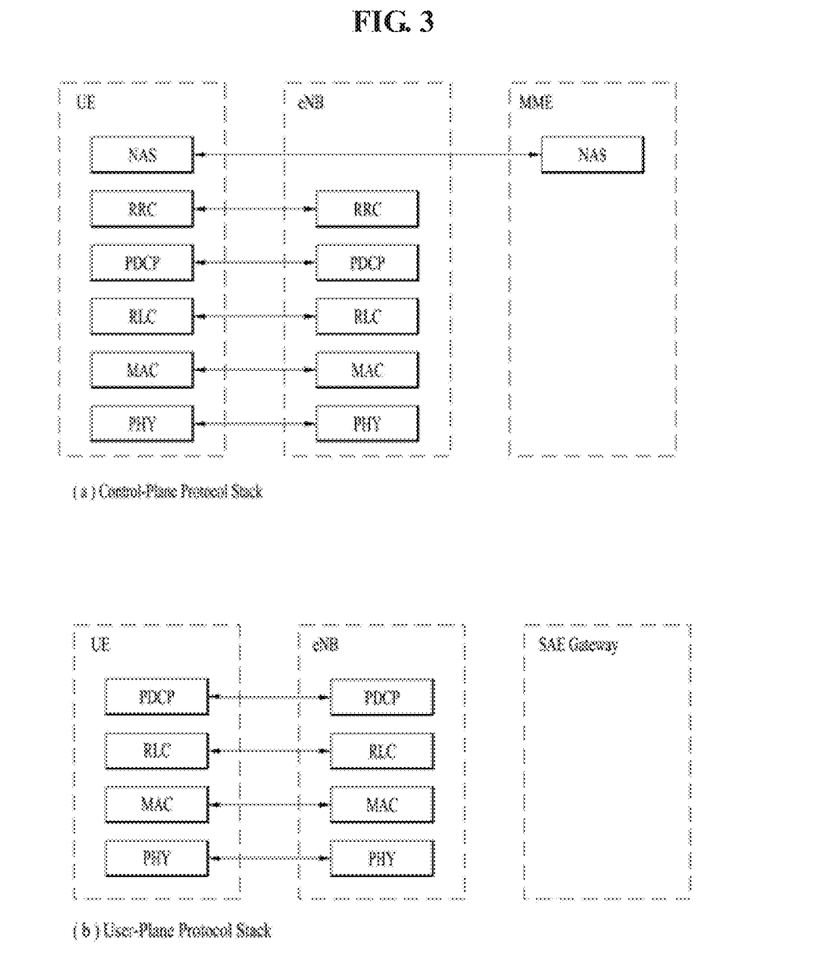
FIG. 3 is a diagram showing a control plane and a user plane of a radio interface protocol between a UE and an E-UTRAN based on a 3GPP radio access network standard.

FIG. 3 is a diagram showing a control plane and a user plane of a radio interface protocol between a UE and an E-UTRAN based on a 3GPP radio access network standard. The control plane refers to a path used for transmitting control messages used for managing a call between the UE and the E-UTRAN. The user plane refers to a path used for transmitting data generated in an application layer, e.g., voice data or Internet packet data.

A physical (PHY) layer of a first layer provides an information transfer service to a higher layer using a physical channel. The PHY layer is connected to a medium access control (MAC) layer located on the higher layer via a transport channel. Data is transported between the MAC layer and the PHY layer via the transport channel. Data is transported between a physical layer of a transmitting side and a physical layer of a receiving side via physical channels. The physical channels use time and frequency as radio resources. In detail, the physical channel is modulated using an orthogonal frequency division multiple access (OFDMA) scheme in downlink and is modulated using a single carrier frequency division multiple access (SC-FDMA) scheme in uplink.

The MAC layer of a second layer provides a service to a radio link control (RLC) layer of a higher layer via a logical channel. The RLC layer of the second layer supports reliable data transmission. A function of the RLC layer may be implemented by a functional block of the MAC layer. A packet data convergence protocol (PDCP) layer of the second layer performs a header compression function to reduce unnecessary control information for efficient transmission of an Internet protocol (IP) packet such as an IP version 4 (IPv4) packet or an IP version 6 (IPv6) packet in a radio interface having a relatively small bandwidth.

A radio resource control (RRC) layer located at the bottom of a third layer is defined only in the control plane. The RRC layer controls logical channels, transport channels, and physical channels in relation to configuration, re-configuration, and release of radio bearers (RBs). An RB refers to a service that the second layer provides for data transmission between the UE and the E-UTRAN. To this end, the RRC layer of the UE and the RRC layer of the E-UTRAN exchange RRC messages with each other.

One cell of the eNB is set to operate in one of bandwidths such as 1.25, 2.5, 5, 10, 15, and 20 MHz and provides a downlink or uplink transmission service to a plurality of UEs in the bandwidth. Different cells may be set to provide different bandwidths.

Downlink transport channels for transmission of data from the E-UTRAN to the UE include a broadcast channel (BCH) for transmission of system information, a paging channel (PCH) for transmission of paging messages, and a downlink shared channel (SCH) for transmission of user traffic or control messages. Traffic or control messages of a downlink multicast or broadcast service may be transmitted through the downlink SCH and may also be transmitted through a separate downlink multicast channel (MCH).

Uplink transport channels for transmission of data from the UE to the E-UTRAN include a random access channel (RACH) for transmission of initial control messages and an uplink SCH for transmission of user traffic or control messages. Logical channels that are defined above the transport channels and mapped to the transport channels include a broadcast control channel (BCCH), a paging control channel (PCCH), a common control channel (CCCH), a multicast control channel (MCCH), and a multicast traffic channel (MTCH).

From release 13, there comes new technology using unlicensed spectrum, such as LWA (LTE WLAN Aggregation), is introduced. Hereinafter, new technology using unlicensed spectrum, such as LAA, is explained.

Figure 4:
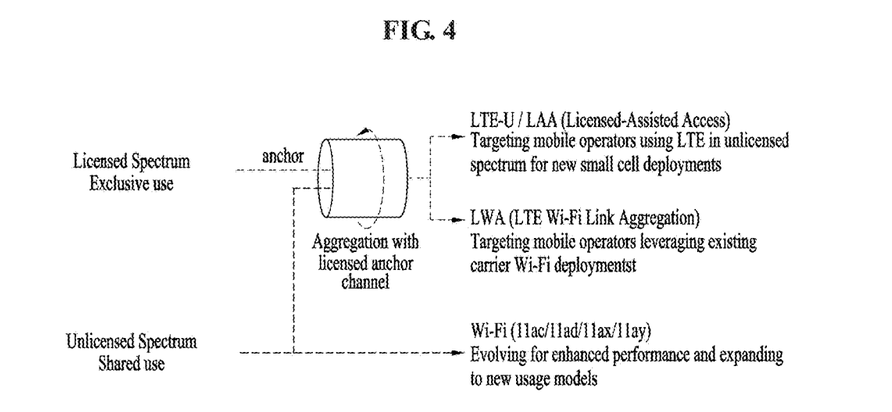
FIG. 4 is a conceptual diagram explaining new technology using unlicensed spectrum.

FIG. 4 is a conceptual diagram explaining new technology using unlicensed spectrum.

As shown in FIG. 4, the unlicensed spectrum for these schemes is supposed as spectrum used for Wi-Fi system, such as IEEE 802.11ac/ad/ax/ay. LTE-U/LAA is directed to aggregate the licensed spectrum, as anchor carrier, with unlicensed spectrum. It is targeting mobile operators using LTE in unlicensed spectrum for new small cell deployment.

LWA is also directed to aggregate the LTE link with Wi-Fi link. It is targeting mobile operators leverage existing carrier Wi-Fi deployments. The core part of the LWA includes five listed objectives as shown below.

The enhanced LWA (eLWA) builds on Rel-13 LWA framework without changes to the LWA architecture and thus supports WLAN nodes deployed and controlled by operators and their partners. The objectives of this work item are to specify the following additional features for LWA:

1. Uplink data transmission on WLAN, including uplink bearer switch and bearer split (RAN2).
2. Mobility optimizations, e.g. intra and inter eNB handover without WT change and improvements for Change of WT (RAN2, RAN3).
3. Potential enhancements to support 60 GHz new band and channels (e.g. in measurements) and increased data rates for 802.11ax, 802.11ad, and 802.11ay (e.g. by PDCP optimizations) (RAN2, RAN3)
4. Additional information collection and feedback e.g. for better estimation of available WLAN capacity (by additional signaling on both Uu and Xw) to improve LWA performance (RAN2, RAN3)
5. Automatic Neighbour Relation (ANR) for LWA e.g. for discovery of WLANs under eNB coverage (RAN3, RAN2)

As there is RLC layer and more specifically RLC AM mode possible, LTE link may be seen as a lossless link due to the ARQ protocol at RLC layer. For continuous LTE only operation, there is no need to have PDCP retransmission. With LTE, PDCP retransmissions are only done at specific occasions, such as handovers and split bearer to nonsplit bearer transitions in DC. Essentially, retransmissions occur in the cases where the RLC entity is released which involves data loss on RLC.

On WLAN, there is only MAC HARQ protocol, which may stop retransmissions after a number of failed attempts. Thus, on WLAN side, PDCP PDUs may be lost also during the normal operation in both UL and DL. In Rel-13, only DL traffic could be steered to WLAN and RAN2 specified flow control reports send from UE to eNB with the main motivation of eNB being able monitor rate on WLAN link and to avoid HFN desync.

However, there needs a study on how the UE and eNode B can efficiently ensure lossless data transmission in uplink.

SUMMARY OF THE INVENTION

To achieve these objects and other advantages and in accordance with the purpose of the invention, as embodied and broadly described herein, a method for a user equipment (UE) transmitting data to a network, the method comprising: setting a poll bit in a PDCP (Packet Data Convergence Protocol) PDU (Protocol Data Unit) to a first value to request a status report including a second FMN (First Missing Number) from the network, if a predetermined number of PDCP SDUs (Service Data Units) are transmitted after a PDCP SDU corresponding to a first FMN; and transmitting the PDCP PDU to the network, is proposed.

The first FMN may be set to a value according to a status report previously received from the network. And, the first FMN may be set to 0, when there was no status report previously received from the network.

Setting the poll bit in the PDCP PDU may be performed when a Next_PDCP_TX_SN minus the first FMN exceeds the predetermined threshold number.

Here, the predetermined threshold number may be configured by a RRC (Radio Resource Control) signaling from the network.

The UE may not transmit a PDCP SDU with a PDCP SN which satisfying:

$$PDCP\ SN \geq \text{first FMN} + (\text{Maximum\_PDCP\_SN}+1)/2$$

until the second FMN is received.

The PDCP PDU may be transmitted via a LWA (LTE WLAN Aggregation) bearer to the network.

In another aspect of the present invention, a user equipment (UE) transmitting data to a network, the UE comprising: a processor configured to set a poll bit in a PDCP (Packet Data Convergence Protocol) PDU (Protocol Data Unit) to a first value to request a status report including a second FMN (First Missing Number) from the network, if a predetermined number of PDCP SDUs (Service Data Units) are transmitted after a PDCP SDU corresponding to a first FMN; and a transceiver connected to the processor and configured to transmit the PDCP PDU to the network, is provided.

The processor may set the first FMN value according to a status report previously received from the network. And, the processor may set the first FMN to 0 when there was no status report previously received from the network.

The processor may set the poll bit in the PDCP PDU to the first value when a Next_PDCP_TX_SN minus the first FMN exceeds the predetermined threshold number.

Here, the predetermined threshold number may be configured by a RRC (Radio Resource Control) signaling from the network.

The processor may not transmit a PDCP SDU with a PDCP SN which satisfying:

PDCP $SN$>=first FMN+(Maximum_PDCP_$SN$+1)/2 until the second FMN is received.

The processor may control the transceiver to transmit the PDCP PDU via a LWA (LTE WLAN Aggregation) bearer to the network.

BRIEF DESCRIPTION OF THE DRAWINGS

The accompanying drawings, which are included to provide a further understanding of the invention and are incorporated in and constitute a part of this application, illustrate embodiment(s) of the invention and together with the description serve to explain the principle of the invention. In the drawings:

FIG. 5 represents one possible structure for the PDCP sublayer. FIG. 5 is only exemplary and it should not restrict implementation;

DETAILED DESCRIPTION OF THE INVENTION

Reference will now be made in detail to the preferred embodiments of the present invention with reference to the accompanying drawings. The detailed description, which will be given below with reference to the accompanying drawings, is intended to explain exemplary embodiments of the present invention, rather than to show the only embodiments that can be implemented according to the invention.

The following detailed description includes specific details in order to provide a thorough understanding of the present invention. However, it will be apparent to those skilled in the art that the present invention may be practiced without such specific details. In some instances, known structures and devices are omitted or are shown in block diagram form, focusing on important features of the structures and devices, so as not to obscure the concept of the invention.

As described before, the following description relates to a method and apparatus for a user equipment (UE) polling status report to a network in order to avoid HFN De-Synchronization problem. The present invention is useful especially in a wireless communication system supporting the LWA scheme, but it can be applied to other wireless communication system.

In order to understand the HFC De-synchronization problem, first, the function of PDCP is explained.

Figure 5:
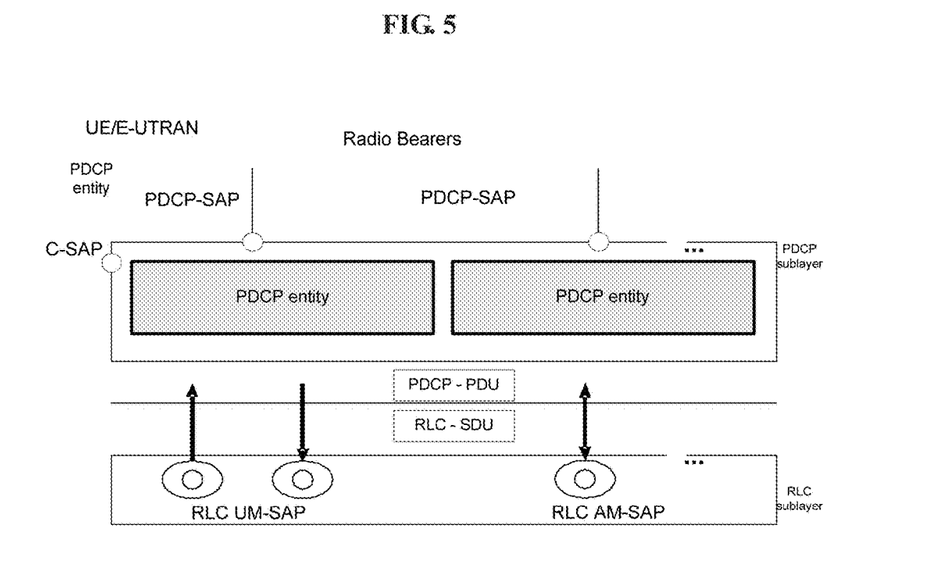

FIG. 5 represents one possible structure for the PDCP sublayer. FIG. 5 is only exemplary and it should not restrict implementation.

Each RB (Radio Bearer) (i.e. DRB, SLRB and SRB, except for SRB0 and SRB1bis) is associated with one PDCP entity. Each PDCP entity is associated with one or two (one for each direction) RLC entities depending on the RB characteristic (i.e. uni-directional or bi-directional) and RLC mode. For split bearers, each PDCP entity is associated with two AM RLC entities. For LWA bearers, each PDCP entity is associated with an AM RLC entity and the LWAAP entity. The PDCP entities are located in the PDCP sublayer. The PDCP sublayer is configured by upper layers.

Based on these, UL data transfer procedures are as following.

At reception of a PDCP SDU from upper layers, the UE may start the discardTimer associated with this PDCP SDU (if configured).

For a PDCP SDU received from upper layers, the UE may associate the PDCP SN corresponding to Next_PDCP_TX_SN to this PDCP SDU. Note that associating more than half of the PDCP SN space of contiguous PDCP SDUs with PDCP SNs, when e.g., the PDCP SDUs are discarded or transmitted without acknowledgement, may cause HFN desynchronization problem.

Still for a PDCP SDU received from upper layers, the UE may perform header compression of the PDCP SDU (if configured), perform integrity protection (if applicable), and ciphering (if applicable) using COUNT based on TX_HFN and the PDCP SN associated with this PDCP SDU, increment Next_PDCP_TX_SN by one.

If Next_PDCP_TX_SN>Maximum_PDCP_SN, the UE may set Next_PDCP_TX_SN to 0; increment TX_HFN by one; and submit the resulting PDCP Data PDU to lower layer.

For convenience of understanding, the followings are the state variables used on PDCP entities in order to specify the PDCP protocol. All state variables are non-negative integers. The transmitting side of each PDCP entity shall maintain the following state variables:

a) Next_PDCP_TX_SN

The variable Next_PDCP_TX_SN indicates the PDCP SN of the next PDCP SDU for a given PDCP entity. At establishment of the PDCP entity, the UE shall set Next_PDCP_TX_SN to 0.

b) TX_HFN

The variable TX_HFN indicates the HFN value for the generation of the COUNT value used for PDCP PDUs for a given PDCP entity. At establishment of the PDCP entity, the UE shall set TX_HFN to 0.

The receiving side of each PDCP entity shall maintain the following state variables:

c) Next_PDCP_RX_SN

The variable Next_PDCP_RX_SN indicates the next expected PDCP SN by the receiver for a given PDCP entity. At establishment of the PDCP entity, the UE shall set Next_PDCP_RX_SN to 0.

d) RX_HFN

The variable RX_HFN indicates the HFN value for the generation of the COUNT value used for the received PDCP PDUs for a given PDCP entity. At establishment of the PDCP entity, the UE shall set RX_HFN to 0.

e) Last_Submitted_PDCP_RX_SN

For PDCP entities for DRBs mapped on RLC AM the variable Last_Submitted_PDCP_RX_SN indicates the SN of the last PDCP SDU delivered to the upper layers. At establishment of the PDCP entity, the UE shall set Last_Submitted_PDCP_RX_SN to Maximum_PDCP_SN.

f) Reordering_PDCP_RX_COUNT

This variable is used only when the reordering function is used. This variable holds the value of the COUNT following the COUNT value associated with the PDCP PDU which triggered t-Reordering.

As explained above, in UL LWA bearer, if the UE transmits PDCP SDU with SN>=FMS+(Maximum_PDCP_SN+1)/2, the eNodeB cannot identify whether the received PDCP SDU is a new one or an old one. For example, if FMS=3 and Maximum_PDCP_SN=4095, the UE shall not transmit PDCP SDU with SN>=2051. If the eNB receives PDCP SDU with SN=2051, the eNodeB does not know the correct COUNT value (which is composed of HFN as MSB and PDCP SN as LSB) of the PDCP SDU because the eNB does not know the correct HFN of the PDCP SDU. This is called HFN de-synchronization problem, and the UE shall be cautious that the newly transmitted PDCP SDU has PDCP SN not larger than FMS+(Maximum_PDCP_SN+1)/2.

In UL split bearer in Dual Connectivity, the UE can ensure that PDCP SDU having PDCP SN>=FMS+(Maximum_PDCP_SN+1)/2 is not transmitted because the UL split bearer uses AM RLC entities as lower layers. Since the AM RLC entity has RLC status reporting, the UE can indirectly know by the RLC status report that whether a PDCP SDU is correctly received or not by the eNB.

However, in UL LWA bearer, one of the lower layer is LWAAP entity. Currently, there is no ARQ mechanism defined in LWAAP entity, and the UE cannot know the transmission result of the PDCP SDU transmitted via LWAAP/WLAN MAC. It means that the UE cannot know the current value of FMS in the eNB side, and thus the UE cannot ensure that PDCP SDU having PDCP SN>=FMS+(Maximum_PDCP_SN+1)/2 is not transmitted.

In order for the UE not to transmit PDCP SDU having PDCP SN>=FMS+(Maximum_PDCP_SN+1)/2 in UL LWA bearer, 4 embodiments are proposed:

Embodiment 1: The UE performs UL polling in certain condition.

Embodiment 2: The eNB transmits PDCP status report or LWA status report in certain condition.

Embodiment 3: The UE avoids new transmission based on the PDCP status report or LWA status report.

Embodiment 4: The UE retransmits NACKed PDCP SDU on LTE link.

Each of above mechanism can be performed separately, or one or more above mechanisms can be performed together.

Embodiment 1—UL Polling

Figure 6:
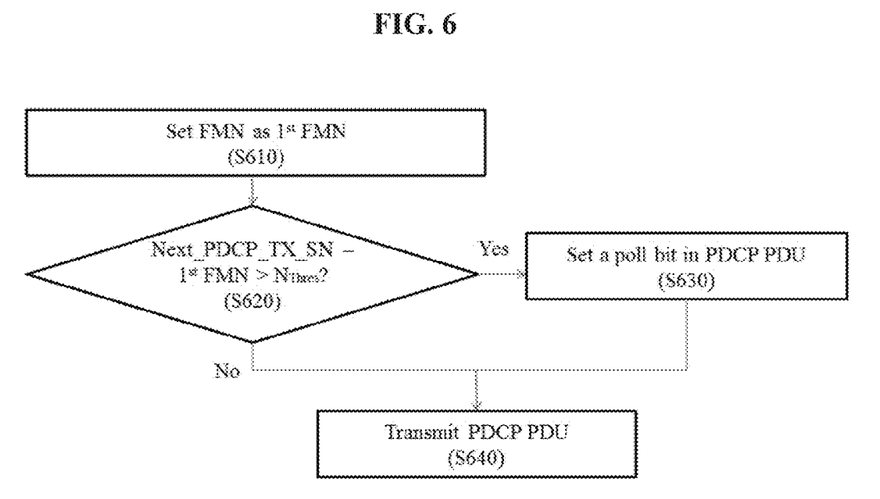
FIG. 6 shows a block diagram for explaining the embodiment 1 of the present invention.

FIG. 6 shows a block diagram for explaining the embodiment 1 of the present invention.

Embodiment 1 of the present invention proposes the UE performing UL polling in certain condition. That is, the UE set a poll bit in a PDCP PDU to a first value to request a status report including a second FMN (First Missing Number) from the network (S630), if a predetermined number of PDCP SDUs are transmitted after a PDCP SDU corresponding to a first FMN (S620). Here, the term 'HFN' may corresponds to 'FMS (First Missing PDCP SN)' of Release 13, but it also includes 'FMC (First Missing Count)' in later standardization.

The first FMN may be set to a value according to a status report previously received from the network (S610). But, when there was no status report previously received from the network, the first FMN may be set to 0 (S620).

In the example of FIG. 6, it is assumed that setting the poll bit in the PDCP PDU is performed when a Next_PDCP_TX_SN minus the first FMN exceeds the predetermined threshold number ($N_{Thres}$) (S620). The predetermined threshold number may be configured by a RRC (Radio Resource Control) signaling from the network.

By the above scheme, the UE is configured not to transmit a PDCP SDU with a PDCP SN which satisfying:

$$PDCP\ SN >= \text{first FMN} + (\text{Maximum\_PDCP\_SN} + 1)/2$$

until the second FMN is received, thereby address the HFN de-synchronization problem as explained above.

As stated above, this HFN de-synchronization problem had been an issue for uplink data transmission when LWA bearer is used. But, this UL polling scheme may be applied to other situations also.

In another example, the UE may set the Poll bit at every $N^{th}$ PDCP PDU. The N may be a positive integer value and configured by the eNB using RRC signalling when the LWA bearer is configured. For example, if N=10, the UE sets the Poll bit in PDCP SDUs with SNs=0, 10, 20, and so on.

Figure 7:
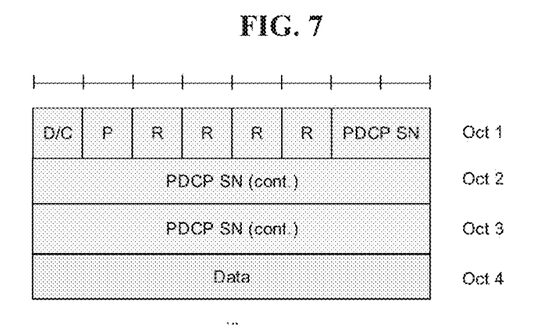
FIG. 7 shows a format of PDCP PDU which can be used for UL polling of embodiment 1.

FIG. 7 shows a format of PDCP PDU which can be used for UL polling of embodiment 1.

Specifically, FIG. 7 shows the format of the PDCP Data PDU when an 18 bit SN length is used. This format is applicable for PDCP Data PDUs carrying data from DRBs mapped on RLC AM. The UE/eNodeB not supporting LWA shall consider the PDCP Data PDU invalid if the P bit is set to 1.

Here, the field indicated by 'P' means polling indication. It may be set to 1 when UE triggers a PDCP status report or LWA status report for LWA as proposed by embodiment 1.

Embodiment 2: eNB Status Reporting

The eNB may transmit a PDCP status report or a LWA status report to the UE in one or more of following conditions:

When a PDCP PDU with Poll bit set to 1 is received from the UE.

When the FMS is updated due to e.g. identifying a missing PDCP PDU or expiry of reordering timer.

When the difference between the highest received PDCP SN and FMS in the PDCP reordering buffer is larger than a threshold.

When the status reporting condition is met, the eNB may set the FMS field or FMN field in the PDCP status report or the LWA status report to the PDCP SN of first missing PDCP SDU in the PDCP reordering buffer. In the PDCP status report, the eNB can additionally indicate other missing PDCP SDUs than FMS/FMN.

Embodiment 3: UE Avoids New Transmission Based on the PDCP Status Report or LWA Status Report When a PDCP status report or a LWA status report is received, the UE does not transmit PDCP SDU with PDCP SN>=FMS+(Maximum_PDCP_SN+1)/2 until a new PDCP status report or a new LWA status report with updated FMS/FMN is received. If an updated FMS/FMN is received, the UE can transmit PDCP SDUs with PDCP SN up to PDCP SN<updated_FMS+(Maximum_PDCP_SN+1)/2.

Embodiment 4: The UE Retransmits NACKed PDCP SDU on LTE Link

When a PDCP status report or a LWA status report is received, the UE retransmits Negatively Acknowledged PDCP SDUs to LTE link, i.e. AM RLC entity and LTE MAC entity. In both PDCP status report and LWA status report, there is FMS/FMN field, and the PDCP SDU with SN=FMS/FMN shall be retransmitted. In the PDCP status report, there is additional BITMAP field which indicates ACK/NACK status of other PDCP SDUs than FMS. The UE shall retransmit all NACKed PDCP SDUs to the eNB using AM RLC entity/LTE MAC entity.

All the NACKed PDCP SDUs shall be considered as data available for transmission in PDCP and shall be counted in BSR in LTE MAC entity.

Figure 8:
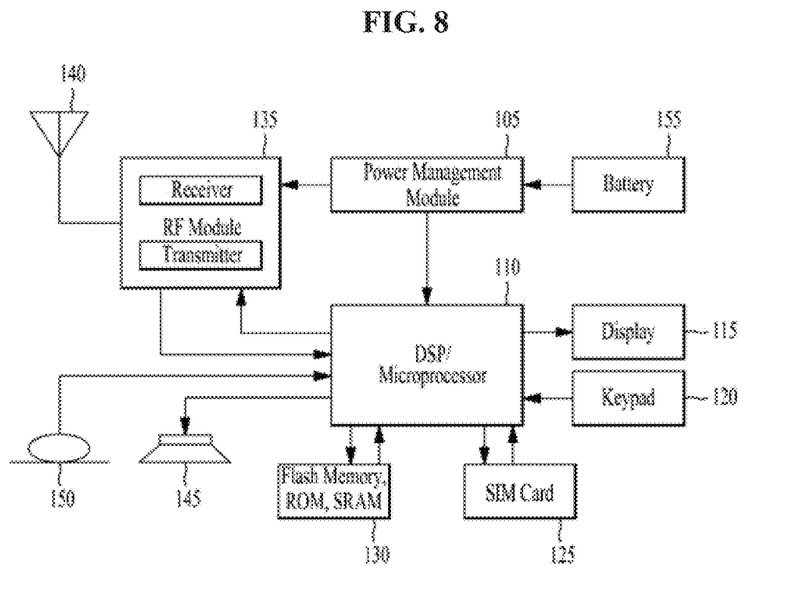
FIG. 8 is a block diagram of a communication apparatus according to an embodiment of the present invention.

FIG. 8 is a block diagram of a communication apparatus according to an embodiment of the present invention.

The apparatus shown in FIG. 8 can be a user equipment (UE) and/or eNB adapted to perform the above mechanism, but it can be any apparatus for performing the same operation.

As shown in FIG. 8, the apparatus may comprises a DSP/microprocessor (110) and RF module (transceiver; 135). The DSP/microprocessor (110) is electrically connected with the transceiver (135) and controls it. The apparatus may further include power management module (105), battery (155), display (115), keypad (120), SIM card (125), memory device (130), speaker (145) and input device (150), based on its implementation and designer's choice.

Specifically, FIG. 8 may represent a UE comprising a receiver (135) configured to receive signal from the network, and a transmitter (135) configured to transmit signals to the network. These receiver and the transmitter can constitute the transceiver (135). The UE further comprises a processor (110) connected to the transceiver (135: receiver and transmitter).

Also, FIG. 8 may represent a network apparatus comprising a transmitter (135) configured to transmit signals to a UE and a receiver (135) configured to receive signal from the UE. These transmitter and receiver may constitute the transceiver (135). The network further comprises a processor (110) connected to the transmitter and the receiver.

It will be apparent to those skilled in the art that various modifications and variations can be made in the present invention without departing from the spirit or scope of the invention. Thus, it is intended that the present invention cover the modifications and variations of this invention provided they come within the scope of the appended claims and their equivalents.

The embodiments of the present invention described herein below are combinations of elements and features of the present invention. The elements or features may be considered selective unless otherwise mentioned. Each element or feature may be practiced without being combined with other elements or features. Further, an embodiment of the present invention may be constructed by combining parts of the elements and/or features. Operation orders described in embodiments of the present invention may be rearranged. Some constructions of any one embodiment may be included in another embodiment and may be replaced with corresponding constructions of another embodiment. It is obvious to those skilled in the art that claims that are not explicitly cited in each other in the appended claims may be presented in combination as an embodiment of the present invention or included as a new claim by subsequent amendment after the application is filed.

In the embodiments of the present invention, a specific operation described as performed by the BS may be performed by an upper node of the BS. Namely, it is apparent that, in a network comprised of a plurality of network nodes including a BS, various operations performed for communication with an MS may be performed by the BS, or network nodes other than the BS. The term 'eNB' may be replaced with the term 'fixed station', 'Node B', 'Base Station (BS)', 'access point', 'gNB', etc.

The above-described embodiments may be implemented by various means, for example, by hardware, firmware, software, or a combination thereof.

In a hardware configuration, the method according to the embodiments of the present invention may be implemented by one or more Application Specific Integrated Circuits (ASICs), Digital Signal Processors (DSPs), Digital Signal Processing Devices (DSPDs), Programmable Logic Devices (PLDs), Field Programmable Gate Arrays (FPGAs), processors, controllers, microcontrollers, or microprocessors.

In a firmware or software configuration, the method according to the embodiments of the present invention may be implemented in the form of modules, procedures, functions, etc. performing the above-described functions or operations. Software code may be stored in a memory unit and executed by a processor. The memory unit may be located at the interior or exterior of the processor and may transmit and receive data to and from the processor via various known means.

Those skilled in the art will appreciate that the present invention may be carried out in other specific ways than those set forth herein without departing from the spirit and essential characteristics of the present invention. The above embodiments are therefore to be construed in all aspects as illustrative and not restrictive. The scope of the invention should be determined by the appended claims and their legal equivalents, not by the above description, and all changes coming within the meaning and equivalency range of the appended claims are intended to be embraced therein.

While the above-described method has been described centering on an example applied to the 3GPP system, the present invention is applicable to a variety of wireless communication systems, e.g. IEEE system, in addition to the 3GPP system.

What is claimed is:

1. A method for a user equipment (UE) transmitting data to a network, the method comprising:

setting a poll bit in a PDCP (Packet Data Convergence Protocol) PDU (Protocol Data Unit) to a first value to request a status report including a second FMN (First Missing Number) from the network, if a predetermined number of PDCP SDUs (Service Data Units) are transmitted after a PDCP SDU corresponding to a first FMN; and transmitting the PDCP PDU to the network, wherein the UE does not transmit a PDCP SDU with a PDCP SN (sequence number) which satisfies a condition [PDCP SN>=first FMN+(Maximum_PDCP_SN+1)/2] until the second FMN is received.

2. The method of claim 1, wherein the first FMN is set to a value according to a status report previously received from the network, and wherein the first FMN is set to 0, when there was no status report previously received from the network.

3. The method of claim 1, wherein setting the poll bit in the PDCP PDU is performed when a Next_PDCP_TX_SN minus the first FMN exceeds the predetermined threshold number.

4. The method of claim 3, wherein the predetermined threshold number is configured by a RRC (Radio Resource Control) signaling from the network.

5. The method of claim 1, wherein the PDCP PDU is transmitted via a LWA (LTE WLAN Aggregation) bearer to the network.

6. A user equipment (UE) transmitting data to a network, the UE comprising:

a processor configured to set a poll bit in a PDCP (Packet Data Convergence Protocol) PDU (Protocol Data Unit) to a first value to request a status report including a second FMN (First Missing Number) from the network, if a predetermined number of PDCP SDUs (Service Data Units) are transmitted after a PDCP SDU corresponding to a first FMN; and a transceiver connected to the processor and configured to transmit the PDCP PDU to the network, wherein the processor does not transmit a PDCP SDU with a PDCP SN (sequence number) which satisfies a condition [PDCP SN>=first FMN+(Maximum_PDCP_SN+1)/2] until the second FMN is received.

7. The UE of claim 6, wherein the processor sets the first FMN value according to a status report previously received from the network, and wherein the processor sets the first FMN to 0 when there was no status report previously received from the network.

8. The UE of claim 6, wherein the processor sets the poll bit in the PDCP PDU to the first value when a Next_PDCP_TX_SN minus the first FMN exceeds the predetermined threshold number.

9. The UE of claim 8, wherein the predetermined threshold number is configured by a RRC (Radio Resource Control) signaling from the network.

10. The UE of claim 6, wherein the processor controls the transceiver to transmit the PDCP PDU via a LWA (LTE WLAN Aggregation) bearer to the network.

* * * * *